United States Patent
Anderson et al.

(10) Patent No.: US 7,469,273 B2
(45) Date of Patent: Dec. 23, 2008

(54) MULTI-PROCESSOR SYSTEM VERIFICATION CIRCUITRY

(75) Inventors: Marquette John Anderson, Cagnes sur Mer (FR); Hakim Bederr, Villeneuve-Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 1314 days.

(21) Appl. No.: 09/778,495

(22) Filed: Feb. 7, 2001

(65) Prior Publication Data

US 2002/0004823 A1    Jan. 10, 2002

(30) Foreign Application Priority Data

Jul. 6, 2000   (EP) ................................. 00401957

(51) Int. Cl.
*G06F 15/173* (2006.01)
(52) U.S. Cl. .................. 709/213; 709/245; 709/208; 709/215; 710/100; 710/305; 711/100; 711/147; 711/148; 711/150; 711/152
(58) Field of Classification Search .............. 709/208, 709/209, 211, 213, 214; 711/147–151; 712/31, 712/43; 702/117, 120
See application file for complete search history.

(56) References Cited

U.S. PATENT DOCUMENTS

| | | | |
|---|---|---|---|
| 5,293,586 A | | 3/1994 | Yamazaki et al. |
| 5,642,057 A | | 6/1997 | Oke et al. |
| 5,649,184 A | * | 7/1997 | Hayashi et al. ............. 711/147 |
| 5,887,146 A | * | 3/1999 | Baxter et al. ................ 709/400 |
| 6,016,525 A | * | 1/2000 | Corrigan et al. ............. 710/100 |
| 6,161,162 A | * | 12/2000 | DeRoo et al. ............... 711/151 |
| 6,163,828 A | * | 12/2000 | Landi et al. ................. 711/147 |
| 6,240,492 B1 | * | 5/2001 | Foster et al. ................. 711/149 |
| 6,604,189 B1 | * | 8/2003 | Zemlyak et al. ............... 712/31 |

* cited by examiner

*Primary Examiner*—Bunjob Jaroenchonwanit
*Assistant Examiner*—Dohm Chankong
(74) *Attorney, Agent, or Firm*—Ronald O. Neerings; Wade James Brady, III; Frederick J. Telecky, Jr.

(57) ABSTRACT

A multiprocessor system (40) includes a MPU subsystem (12), with master MPU (16) and shared memory (24), and a DSP/Coprocessor subsystem (14), with one or more slave DSP/Coprocessors (26). The system memory (20) is accessed by each DSP/Coprocessor subsystem (14) through a cache (28) and external memory interface (30). A verification interface (42) is used in verification mode to isolate the DSP/Coprocessor subsystem (14) from the MPU subsystem (12) and to translate system memory requests from the external memory interfaces (30) (through an arbiter (52), where multiple external memory interfaces are used) to a protocol which can be used to access the data from the shared memory (24).

15 Claims, 2 Drawing Sheets

MULTI-PROCESSOR SYSTEM VERIFICATION CIRCUITRY

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to integrated circuits and, more particularly, to a multiprocessor system verification circuit.

2. Description of the Related Art

Verifying the operation of an integrated circuit design is generally an extremely complicated procedure. This is especially true in the field of multi-processor designs, where a microprocessor unit is combined with other processor units, such as DSPs (digital signal processors), coprocessors or other microprocessor units.

Verifying the operation of an integrated circuit may take several forms. One type of verification is generally referred to as "design debugging." Debugging techniques are used to resolve weaknesses in the design of an integrated circuit. Another type of verification is generally referred to as "production testing." The objective of production testing is to identify product which does not meet performance requirements (or to sort product into one of several categories having different production requirements). There are two types of production testing. Functional testing looks for functional differences due to design defects. This type of testing is typically performed using ATPG (automatic test pattern generation) patterns or custom functional test patterns. Performance testing identifies parts that work at a specific speed rating.

Matters are further complicated when design of one of the processor units is from a different source from other processor units on the integrated circuit. This can occur, for example, when a company wishes to combine its microprocessor design with DSPs or coprocessors from another company to provide a specialized integrated circuit. Generally speaking, neither company will want to provide detailed specifications to their designs. Accordingly, verifying the operation of each processor can become problematic.

Therefore, a need has arisen for a method and apparatus for verifying multiprocessor systems.

BRIEF SUMMARY OF THE INVENTION

The present invention provides a processing device comprising a master processor, a system memory and a slave processor subsystem. The slave processor system includes a slave processor, a shared memory accessible by said master processor and said slave processor, and an external memory interface allowing said slave processor to access said system memory. A verification interface passes system memory accesses to the system memory in a normal mode and passes system memory accesses to the shared memory in a verification mode.

The present invention provides significant advantages over the prior art. First, debugging the slave processor subsystem may be performed without understanding the implementation of the master processor subsystem in which the slave processor subsystem is embedded. Second, extraneous interactions are isolated from the slave processor system during verification procedures. Third, the external memory interface can be production tested at operating speed in the same way as an application is actually executed in the field, thereby increasing the fault coverage and capability for performance testing of the slave subsystem.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1-4 of the drawings, like numerals being used for like elements of the various drawings.

Figure 1:
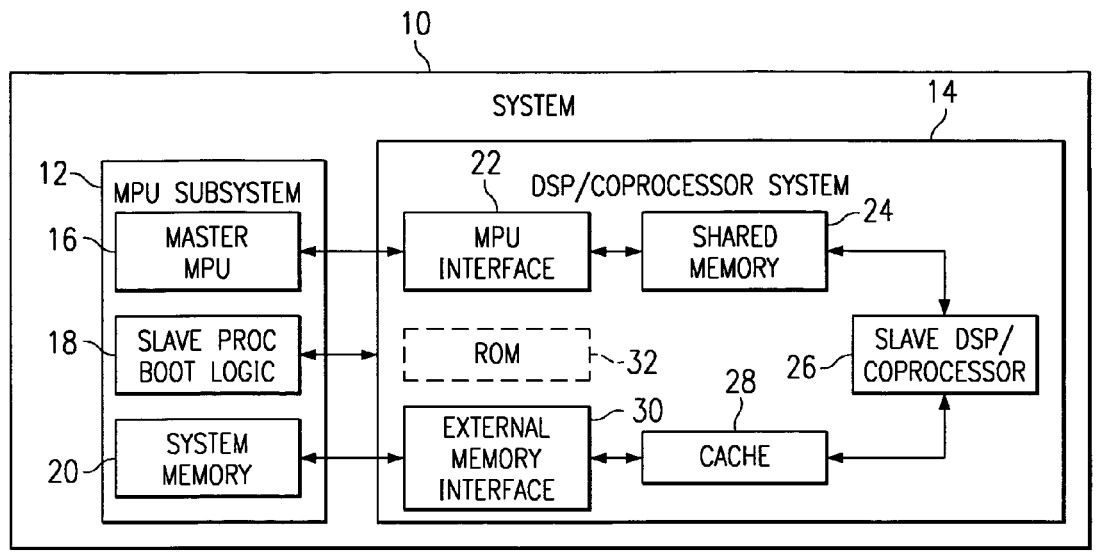
FIG. 1 illustrates a block diagram of a prior art multiprocessor system.

FIG. 1 illustrates a basic diagram of a multiprocessor system 10 including an MPU subsystem 12 and a DSP/Coprocessor subsystem 14. For purposes of illustration, it will be assumed that the MPU subsystem 12 and the DSP/Coprocessor subsystem 14 are proprietary designs by different companies, although this is not necessary for use of the present invention. MPU subsystem 12 includes a master MPU 16, slave processor boot logic 18 and system memory 20. DSP/Coprocessor subsystem 14 includes an MPU interface 22 for interfacing with the MPU subsystem 12, a shared memory 24 coupled to the MPU interface 22, a slave DSP/Coprocessor 26 coupled to the shared memory 24, a cache memory 28, and an external memory interface 30 coupled to the system memory 20 and cache 28. An optional ROM 32 may be used to store programs or data on the DSP/ Coprocessor subsystem 14 for testing purposes.

The block diagram shown in FIG. 1 illustrates a general purpose multiprocessor system 10, which could be used for a variety of applications, such as cellular phones, smart phones, personal digital assistants (PDAs), portable computers, and so on. Typically, the DSP/Coprocessor subsystem 14 is used by the multiprocessor system 10 for performing certain tasks, such as voice recognition, handwriting recognition, text-to-speech conversion, to name a few. The DSP/Coprocessor subsystem 14 is designed to execute certain tasks much more efficiently than a general-purpose processor.

Commonly, the designer of a master MPU 16 may wish to combine the MPU subsystem 12 with a DSP/Coprocessor subsystem 14 in order to take advantage of faster execution of certain tasks. During both the design and implementation stages, however, it may be desirable to verify the operation of the operation of the multiprocessor system 10, including verifying operations of the DSP/ Coprocessor subsystem 14.

To debug the DSP/Coprocessor subsystem 14, several steps are necessary. First, programs for execution by the master MPU 16 are loaded into system memory 20. These programs generally comprise code to allow the slave DSP/Coprocessor 26 to function. Second, code for the slave DSP/Coprocessor 26 is loaded into the system memory 20. The master MPU 16 executes the code, setting up the system memory for access by the external memory interface 30 and programming the slave processor boot logic 18 to control the slave processor(s). The slave DSP/Coprocessor 26 programs the cache memory 28 and executes the code from the system memory. The results can be analyzed using traditional debugging techniques, such as setting breakpoints and observing memory locations.

The DSP/Coprocessor subsystem 14 can be difficult to debug within the multiprocessor system 10, since the operation of the MPU subsystem 12 is generally unknown to the designers of the DSP/Coprocessor subsystem 14. Further, the DSP/Coprocessor subsystem 14 is not isolated from extraneous system interactions, such as multiple buses and interfaces on the MPU subsystem 12.

For production performance testing, speed paths in the DSP/Coprocessor subsystem 14 are identified and code is written to activate the speed paths in the DSP/Coprocessor subsystem 14. Code for the master MPU 16 and test patterns and code for the slave DSP/Coprocessor 26 are stored in the system memory 20. The test patterns and slave DSP/Coprocessor code are transferred from the system memory 20 to the shared memory 24. The code is then executed by the slave DSP/Coprocessor 26 to test the external memory interface 30 and the cache 28.

Once again, production testing of parts based on the speed paths in the DSP/Coprocessor subsystem 14 requires knowledge of the detailed operation of the MPU subsystem 12.

In an alternative embodiment, the test pattern and code may be stored in a micro-code ROM 32. In this case, test execution may be initiated by booting to the first address in the micro-code ROM 32.

This embodiment requires a high area overhead for the ROM 32 and has fixed fault coverage.

Figure 2:
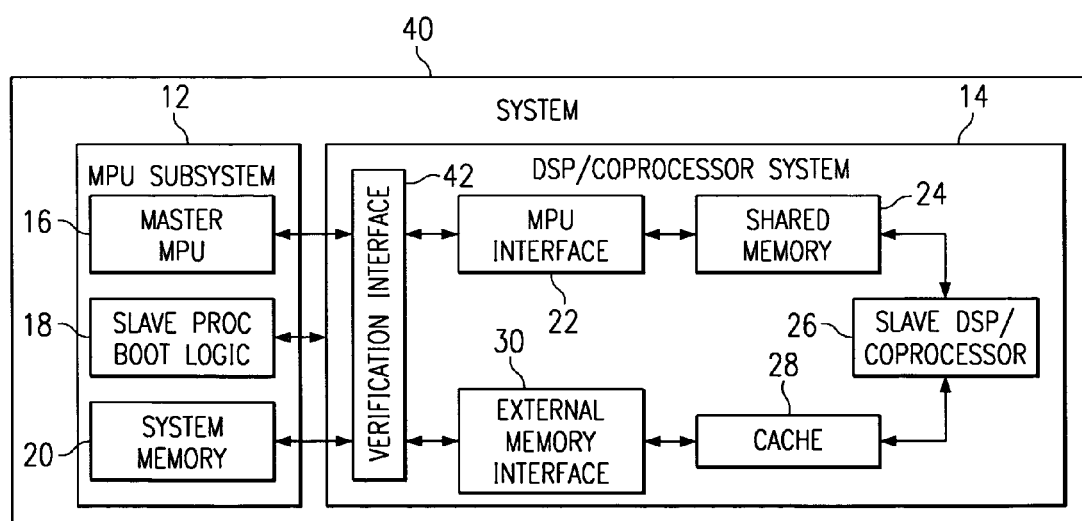
FIG. 2 illustrates a block diagram of a multiprocessor system with a verification interface.

FIG. 2 illustrates a block diagram of a multiprocessor system 40 using a verification interface 42 to aid in debugging and testing. Once again, the multiprocessor system 10 includes an MPU subsystem 12 and a DSP/Coprocessor subsystem 14. MPU subsystem 12 includes a master MPU 16, slave processor boot logic 18 and system memory 20. DSP/Coprocessor subsystem 14 includes an MPU interface 22 for interfacing with the MPU subsystem 12 via the verification interface 42, a shared memory 24 coupled to the MPU interface 22, a slave DSP/Coprocessor 26 coupled to the shared memory 24, a cache memory 28, and an external memory interface 30 coupled to verification interface 42 and cache 28. Verification interface 42 is also coupled to system memory 20. The entire multiprocessor system 40 may be fabricated on a single integrated circuit.

In normal operation of the multiprocessor system 40, the verification interface 42 is disabled. In this state, control and data signals pass between the system memory 20 and external memory interface 30 and between the master MPU 16 and the MPU Interface 22 as shown in FIG. 1; i.e., under normal operations, the verification interface 42 is transparent. However, when the verification interface 42 is enabled for verification purposes, requests from the external memory interface 30 to access system memory 20 are translated by the verification interface 42 such that the shared memory 24 is accessed instead. Hence, the MPU subsystem 12 can be completely isolated from the DSP/Coprocessor subsystem 14 during verification procedures.

The verification interface 42 may be implemented in a independent module of the DSP/Coprocessor subsystem 14 or, alternatively, the verification interface 42 may be implemented as part of the external memory interface 30.

Figure 3:
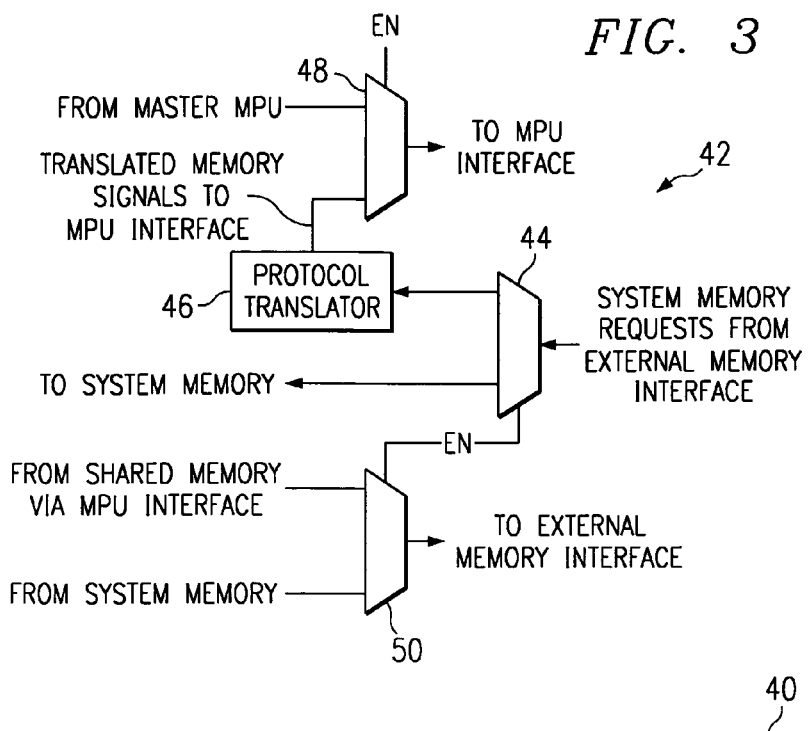
FIG. 3 illustrates a block diagram of a the verification interface.

FIG. 3 illustrates a block diagram of the verification interface 42. Control signals from the external memory interface 30 to access the system memory 20 are received by demultiplexer 44. When verification mode is disabled, the signals are passed to the system memory 20. When verification mode is enabled, the signals are passed to protocol translator 46. Request multiplexer 46 translates the memory requests to a form acceptable by the MPU interface 22. The output of protocol translator 46 is received by multiplexer 48, which also receives control signals from master MPU 16. When verification mode is disabled, the signals from the master MPU 16 are passed by multiplexer 48 to the MPU interface 22. When verification mode is enabled, multiplexer 48 passes the output of protocol translator 46 to the MPU interface 22. Similarly, multiplexer 50 receives the data from shared memory 24 (via the MPU interface 22) and from system memory 20. When verification mode is disabled, data from the system memory is passed through multiplexer 50 to the external memory interface 30. When verification mode is enabled, data from the shared memory 24 is passed through multiplexer 50 to the external memory interface 30.

During normal operations (i.e., verification mode is disabled), signals pass between the master MPU 16 and the MPU interface 22 and between system memory 20 and the external memory interface 30, as shown in FIG. 1. In verification mode, however, the MPU subsystem 12 is isolated from the DSP/Coprocessor subsystem 14. Requests from the external memory interface 30 are translated to a form that is used by the MPU interface 22 to access shared memory 24. Data from the shared memory 24 pursuant to a system memory request is passed to the external memory interface 30.

The protocol translator can translate between different protocol types used by the MPU interface 22 and the external memory interface 30. For example, the external memory interface 30 generally uses a request-based protocol whereas the MPU interface may use a strobe-based protocol. Thus, the protocol translator may translate a request signal to a strobe signal for accessing the shared memory 24 through the MPU interface 22.

Accordingly, referring to FIGS. 2 and 3, the verification interface 42 can be used to debug the DSP/Coprocessor subsystem 14 without knowledge of the MPU subsystem 12 and to isolate the DSP/Coprocessor subsystem 14 from extraneous system interaction with the MPU subsystem 12. To debug the DSP/Coprocessor subsystem 14, the debug interface programs the external memory interface 30 and loads debug code and data into the shared memory. The verification interface 42 is then enabled in verification mode and the DSP/Coprocessor subsystem 14 is reset. The slave DSP/Coprocessor 26 programs the cache and executes the debug code from shared memory 24. Memory access signals from the external memory interface 30 to system memory are translated by the protocol translator 46, such that the request is fulfilled by shared memory 24. Traditional debugging techniques can then be used to analyze the operation of the DSP/Coprocessor subsystem 14.

For production testing using a critical path test, patterns for activating and testing critical speed paths in the DSP/Coprocessor subsystem 14 can be generated and stored in the shared memory 24. After loading the code in the shared memory 24, the verification interface 42 is enabled and the external memory interface 30 and cache can be tested at speed to determine whether any of the paths fail. Once again, system memory accesses by the external memory interface 30 are translated by the verification interface 42 and directed to the shared memory 24 via the MPU interface 22. This eliminates the need for a ROM for storing test patterns, saving chip area. Further, the test pattern set can be modified at any time during design or silicon debug, as opposed to a fixed test pattern set encoded in ROM. Since the test pattern set can be changed even after silicon samples are produced, the initial test pattern generation can be easily modified to accommodate late changes in the chip design.

Figure 4:
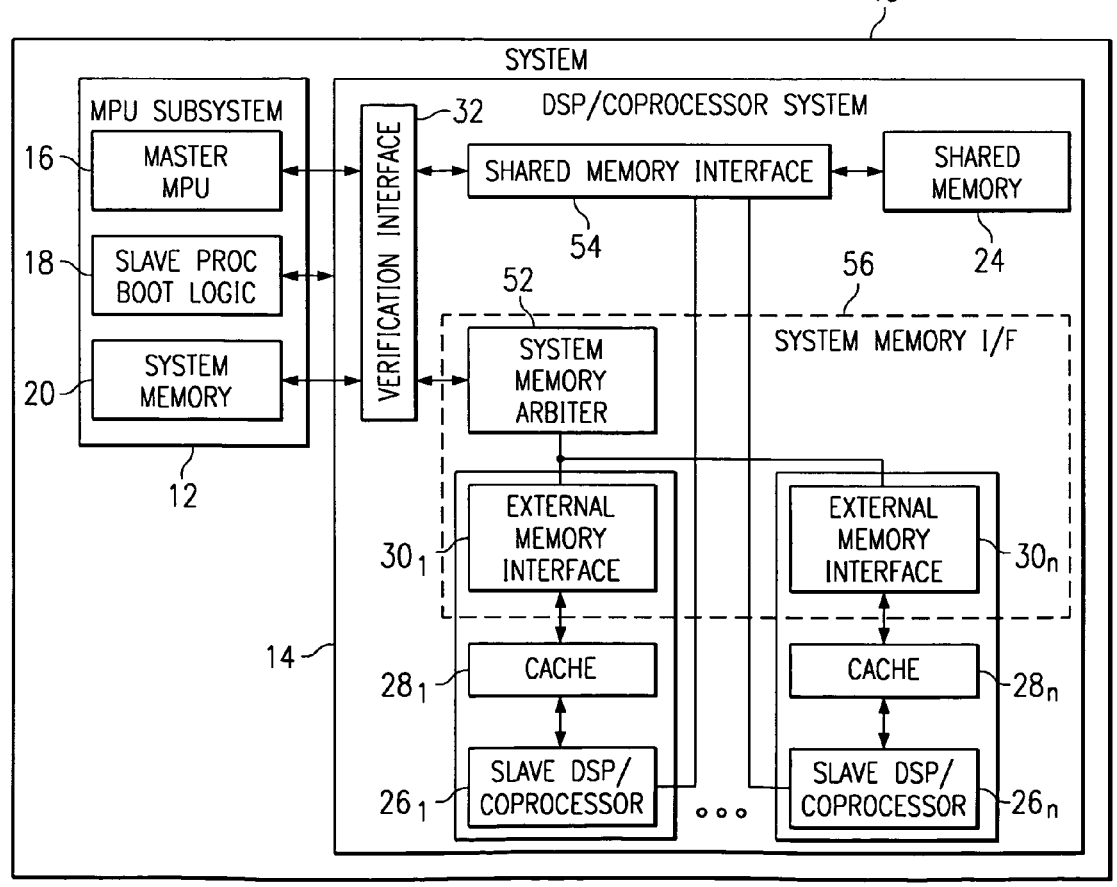
FIG. 4 illustrates a block diagram of a multiprocessor system using a master MPU, multiple slave DSP/Coprocessors and verification interface.

FIG. 4 illustrates an embodiment of the invention wherein multiple DSPs and/or coprocessors are implemented. In this case, a system memory arbiter 52 is provided to arbitrate memory requests from the external memory interfaces 30 associated with the various cache memories 28 and slave DSP/Coprocessors 26 (individually referenced as external memory interfaces $30_1$ through $30_n$, cache memories $28_1$ through $28_n$ and slave DSP/Coprocessors $26_1$ through $26_n$).

In this embodiment, the verification interface 42 is coupled between a system memory interface 56, including the system memory arbiter 52 and the external memory interfaces 30, and the system memory 20 and between the master MPU 16 and the MPU interface 22. Accesses between various external memory interfaces 30 are resolved by the system memory arbiter 52. Accesses to the shared memory 24 from the master MPU 16 and the slave DSP/Coprocessors 26 are resolved by shared memory interface 54.

If the verification interface 42 is disabled, the requests from the system memory arbiter 52 will be passed to the system memory 20. On the other hand, if the verification interface 42 is enabled for testing or debugging, requests from the system memory arbiter 52 will be translated and passed to the MPU interface 22 for accessing the shared memory 24. This architecture will support any number of slave DSP/Coprocessors 26. Debugging the subsystem and performing critical path testing can be performed as described above in connection with a multiprocessor system 40 using a single slave DSP/Coprocessor 26.

The present invention provides significant advantages over the prior art in both the debugging and testing of a processor device. First, it is not necessary to understand the implementation of the MPU subsystem 12 in which the DSP/Coprocessor subsystem 14 is embedded in order to debug the DSP/Coprocessor subsystem 14. Second, extraneous system interactions are isolated from the DSP/Coprocessor subsystem 14 during testing. Third, the external memory interface 30 and cache 28 can be production tested at operating speed in the same way as the application is actually executed in the field, thereby increasing the test coverage of the DSP/Coprocessor subsystem 14.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

The invention claimed is:

1. A processing device comprising:
    a master processor;
    a system memory;
    a slave processor subsystem including:
        a slave processor;
        a shared memory accessible by said master processor and said slave processor;
        an external memory interface allowing said slave processor to access said system memory;
        circuitry for receiving a signal for specifying a normal mode for normal operation of the processing device or verification mode for testing the processing device; and
        a verification interface for selectively passing system memory accesses either to the system memory or the shared memory responsive to the signal, wherein accesses directed towards the system memory access are passed to said system memory in a normal mode and wherein accesses directed towards the system memory are passed to said shared memory in a verification mode.

2. The processing device of claim 1 wherein said slave processor subsystem further includes a cache memory coupled to said external memory controller and said slave processor.

3. The processing device of claim 1 wherein said verification interface includes a protocol translator for translating between a first protocol associated with memory accesses of said system memory and a second protocol associated with memory accesses of said shared memory.

4. The processing device of claim 1 wherein said verification interface comprises multiplexing circuitry for passing data to said external memory interface from either said system memory or said shared memory responsive to whether said verification interface is in a normal mode or a verification mode.

5. The processing device of claim 4 and further comprising a control interface coupled between said master processor and said shared memory.

6. The processing device of claim 5 wherein said multiplexing circuitry comprises first multiplexing circuitry and further comprising second multiplexing circuitry for passing control signals to said control interface from either said master processor or said external memory interface responsive to whether said verification interface is in a normal mode or a verification mode.

7. The processing device of claim 6 and further comprising a protocol translator for translating between a first protocol associated with memory accesses of said system memory and a second protocol associated with memory accesses of said shared memory.

8. A processing device comprising:
    a master processor;
    a system memory;
    a slave processor subsystem including:
        one or more a slave processors;
        a shared memory accessible by said master processor and said slave processor;
        circuitry for receiving a signal for specifying a normal mode for normal operation of the processing device or verification mode for testing the processing device;
        an system memory interface allowing said slave processors to access said system memory; and
        a verification interface for selectively passing system memory accesses either to the system memory or the shared memory responsive to the signal, wherein accesses directed towards the system memory access are passed to said system memory in a normal mode and wherein accesses directed towards the system memory are passed to said shared memory in a verification mode.

9. The processing device of claim 8 wherein said system memory interface comprises:
    respective external memory interfaces associated with each slave processor; and a memory arbiter for arbiting between memory accesses generated by each of said external memory interfaces.

10. The processing device of claim 8 wherein said slave processor subsystem further includes cache memories associated with each of said slave processors.

11. The processing device of claim 8 wherein said verification interface includes a protocol translator for translating between a first protocol associated with memory accesses of said system memory and a second protocol associated with memory accesses of said shared memory.

12. The processing device of claim 8 wherein said verification interface comprises multiplexing circuitry for passing data to said system memory interface from either said system memory or said shared memory responsive to whether said verification interface is in a normal mode or a verification mode.

13. The processing device of claim 12 and further comprising a control interface coupled between said master processor and said shared memory.

14. The processing device of claim 13 wherein said multiplexing circuitry comprises first multiplexing circuitry and further comprising second multiplexing circuitry for passing control signals to said control interface from either said master processor or said system memory interface responsive to whether said verification interface is in a normal mode or a verification mode.

15. The processing device of claim 14 and further comprising a protocol translator for translating between a first protocol associated with memory accesses of said system memory and a second protocol associated with memory accesses of said shared memory.

* * * * *